United States Patent
Nagato et al.

(10) Patent No.: US 8,643,805 B2
(45) Date of Patent: Feb. 4, 2014

(54) BACKLIGHT AND LIQUID CRYSTAL DISPLAY DEVICE

(71) Applicant: Kabushiki Kaisha Toshiba, Minato-ku (JP)

(72) Inventors: Hitoshi Nagato, Tokyo (JP); Takashi Miyazaki, Kanagawa-ken (JP); Yutaka Nakai, Kanagawa-ken (JP); Hajime Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/916,248

(22) Filed: Jun. 12, 2013

(65) Prior Publication Data

US 2013/0271698 A1    Oct. 17, 2013

Related U.S. Application Data

(62) Division of application No. 13/040,902, filed on Mar. 4, 2011, now abandoned.

(30) Foreign Application Priority Data

Aug. 11, 2010    (JP) ................... 2010-180590

(51) Int. Cl.
*G02F 1/1335*    (2006.01)

(52) U.S. Cl.
USPC ............... 349/62; 349/106; 362/97.2

(58) Field of Classification Search
None
See application file for complete search history.

(56) References Cited

U.S. PATENT DOCUMENTS 4,924,356 A    5/1990  French et al.
8,345,182 B2 *  1/2013  Sugita et al. ............ 349/62

FOREIGN PATENT DOCUMENTS

| JP | 2-214287 | 8/1990 |
| JP | 2004-45853 | 2/2004 |
| JP | 2008-70437 | 3/2008 |
| JP | 2009-110977 | 5/2009 |
| JP | 2010-113854 | 5/2010 |

OTHER PUBLICATIONS

Japanese Office Action mailed on Jun. 15, 2012 in Japanese Application No. 2010-180590 filed Aug. 11, 2010 (w/English translation).
Japanese Office Action mailed on Mar. 8, 2013 in Japanese Application No. 2010-180590 filed Aug. 11, 2010 (w/English translation).

* cited by examiner

*Primary Examiner* — Richard Kim
(74) *Attorney, Agent, or Firm* — Oblon, Spivak, McClelland, Maier & Neustadt, L.L.P.

(57) ABSTRACT

A backlight includes a case having plural apertures in a main face thereof and a light source disposed in the case. A total area of the plural apertures is not less than 8% and not more than 15% of an area of the main face.

2 Claims, 13 Drawing Sheets

BACKLIGHT AND LIQUID CRYSTAL DISPLAY DEVICE

CROSS REFERENCE TO RELATED APPLICATION

This application is a division of and claims the benefit of priority under 35 U.S.C. §120 from U.S. Ser. No. 13/040,902 filed Mar. 4, 2011, and claims the benefit of priority under 35 U.S.C. §119 from Japanese Patent Application No. 2010-180590 filed Aug. 11, 2010, the entire contents of each of which are incorporated herein by reference.

FIELD

Embodiments basically relate to a backlight and a liquid crystal display device.

BACKGROUND

In recent years, a thin and light display device such as a liquid crystal display device has been widely used as a display for a personal computer and a display for a small-size television. In particular, when a liquid crystal display device is used for portable devices such as a portable computer and a portable television, it is required to reduce power consumption, because power is supplied by a battery.

A liquid crystal display device of transmissive type is provided with a backlight at a back face of a liquid crystal panel. Here, reducing power consumption of the backlight allows a reduction in power consumption of the liquid crystal display device.

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

DESCRIPTION

As will be described below, according to an embodiment, a backlight includes a case having two or more apertures in a main face thereof and a light source disposed inside the case. The total area of the apertures is not less than 8% and not more than 15% of the area of the main face.

First Embodiment

Figure 1:
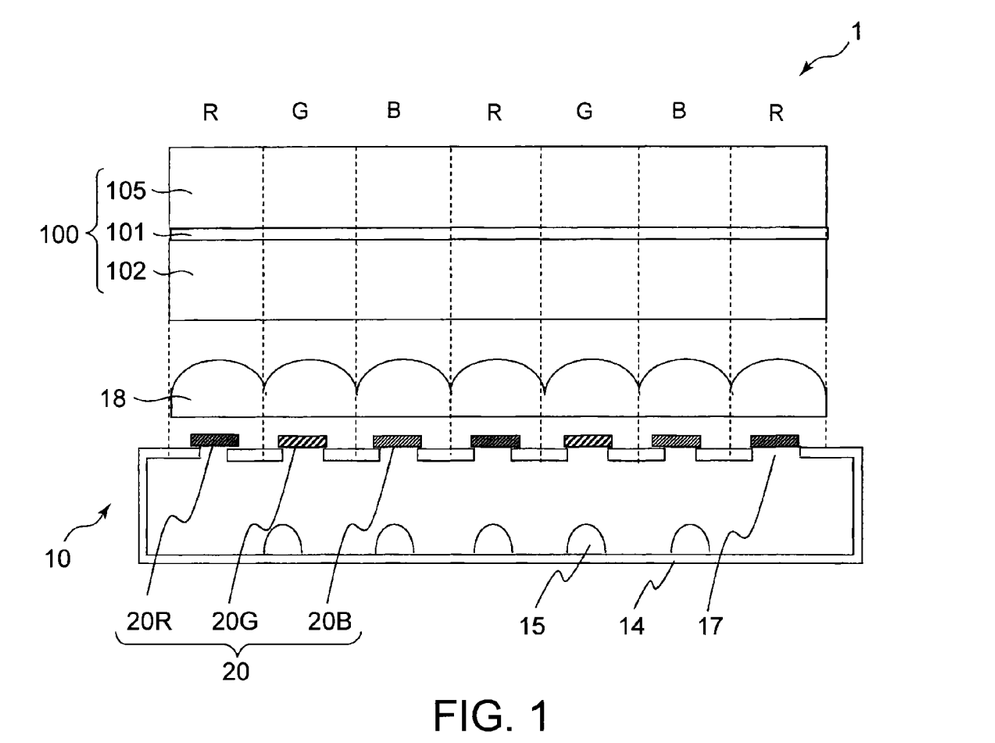
FIG. 1 is a sectional view showing a liquid crystal display device according to a first embodiment.

A liquid crystal display device having a backlight according to a first embodiment will be explained with reference to FIG. 1. FIG. 1 is a view showing a cross-section of a display device capable of displaying a color image.

A liquid crystal display device 1 is provided with a liquid crystal panel 100 to display an image and the like, a lens array 18 having two or more lenses and facing the liquid crystal panel, and a backlight 10 facing the lens array 18. The liquid crystal panel 100 is provided with an array substrate 102 having a number of pixel electrodes to be arranged in a matrix, a counter substrate 105 to face the array substrate 102, and a liquid crystal layer 101 to be held between the array substrate 102 and the counter substrate 105.

The lens array 18 focuses light from the backlight 10 onto the respective pixels of the liquid crystal panel 100. The respective lenses have a section of a semicircular column shape and are aligned to protrude toward the side of the liquid crystal panel 100.

The backlight 10 is provided with a hollow case 14 and a light source 15, such as an LED, which is disposed on a lower wall face of the case 14 and inside the case 14. Two or more apertures 17 are arranged at an upper wall face of the case 14 to face the lens array 18 and to correspond to the respective lenses thereof. The apertures 17 are covered with two or more interference filters 20 of light non-absorbing type (i.e., of reflection type).

Figure 2A:
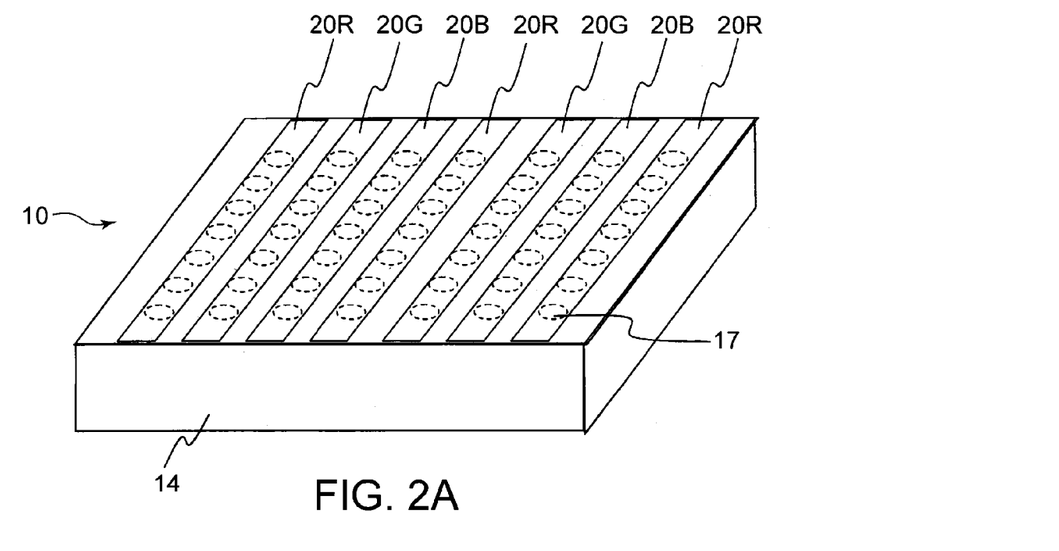
FIGS. 2A to 2C are perspective views showing a backlight in the first embodiment.
Figure 2B:
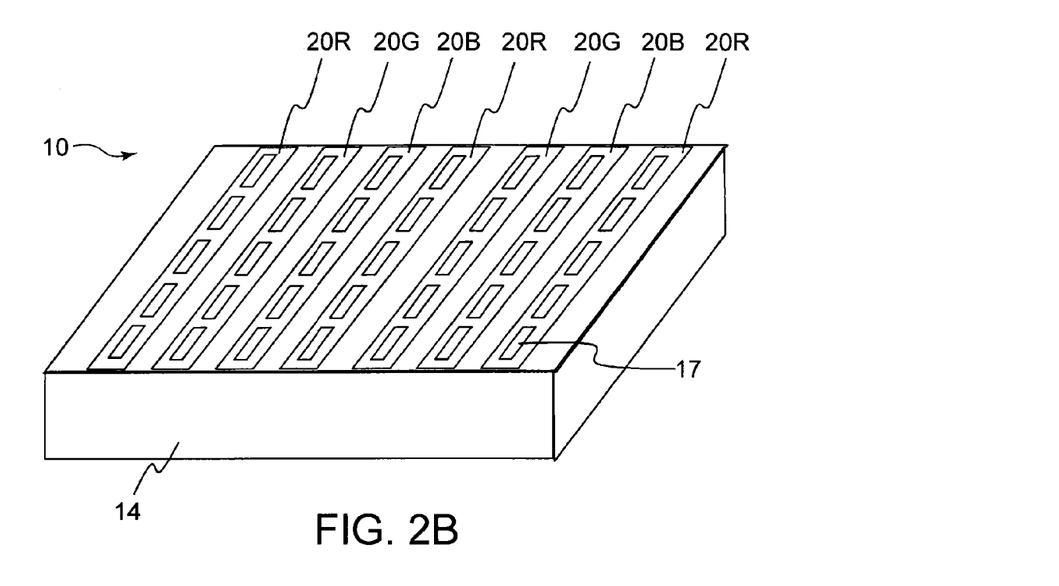
Figure 2C:
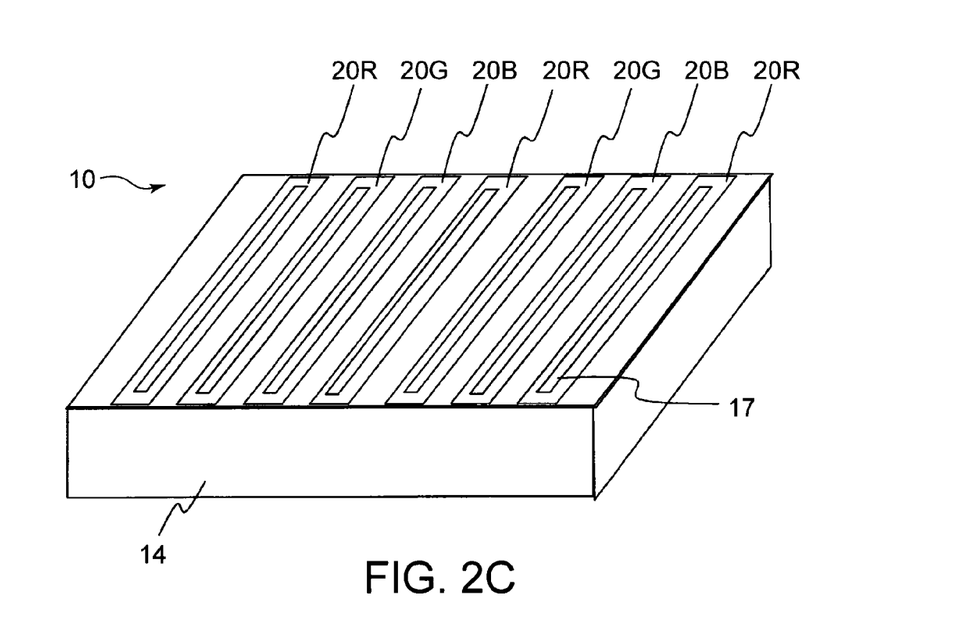

FIGS. 2A and 2B are perspective views of backlights. As shown in FIGS. 2A and 2B, apertures 17 of the case 14 are arranged to be aligned in a row direction and in a column direction. FIG. 2A shows circular apertures 17 and FIG. 2B shows slit-shaped apertures 17. Alternatively, the apertures 17 may be formed in the shape of a slit along the interference filters 20 as shown in FIG. 2C.

The inside wall of the case 14 includes a material having a high reflectance. Metals such as stainless steel, resin or the like can be used for the material of the case 14 and the inside wall face thereof can be coated with aluminum, silver or the like. For example, aluminum or silver may be deposited on the inside wall face or a sheet on which aluminum or silver is deposited may be stuck to the inside wall face. The apertures 17 can be formed using a method such as injection molding, press working, laser machining, and etching.

The interference filter 20 includes a red interference filter 20R, a green interference filter 20G and a blue interference filter 20B having selectivity of wavelength. The red interference filter 20R allows red light to pass therethrough, and reflects green light and blue light. The green interference filter 20G allows green light to pass therethrough, and reflects red light and blue light. The blue interference filter 20B allows blue light to pass therethrough, and reflects red light and green light. Each interference filter 20 is formed of a dielectric multilayer including dielectric thin films having respective reflective indexes. Depending on a thickness of the dielectric multilayer, light of a certain wavelength passes through the dielectric multilayer while light of other wavelength is reflected.

For example, the dielectric multilayer is formed by means of alternately laminating a layer of a high reflective index material and a layer of a low reflective index material. Examples of the high reflective index material include $TiO_2$, $Ta_2O_3$, $ZnO_2$, $ZnO_2$, $ZnS$, $ZrO_2$, $CeO_2$, and $Sb_2O_3$. Examples of the low reflective index material include $SiO_2$, $MgF_2$, $Na_3AlF_6$.

One of the lenses of the lens array 18 is arranged for each row or column of the aligned apertures 17.

Figure 3:
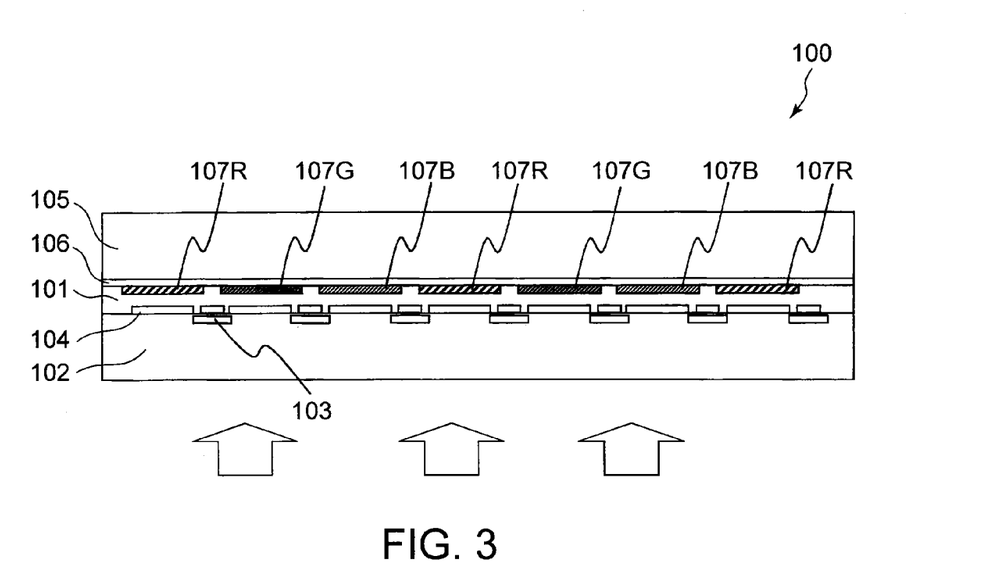
FIG. 3 is a view showing a cross-section of a liquid crystal panel in the first embodiment.

FIG. 3 is an enlarged view showing a cross-section of the liquid crystal panel 100. The array substrate 102 is provided with two or more pixel electrodes 104 and active elements 103 such as thin film transistors (TFT) on a main face thereof to hold the liquid crystal layer 101. The counter substrate 105 is provided with a counter electrode 106 and color filters 107R, 107G, 107B of absorption type on a main face thereof to hold the liquid crystal layer 101. Here, although not shown in FIG. 3, the actual liquid crystal panel 100 is provided with polarization plates on outer faces of the array substrate 102 and the counter substrate 105.

The color filters 107R, 107G, and 107B include a red color filter 107R through which red light passes, a green color filter 107G through which green light passes, and a blue color filter 107B through which blue light passes. Each of the color filters 107R, 107G, and 107B is arranged to face each pixel electrode 104. Further, the red color filter 107R, the green color filter 107G, and the blue color filter 107B are disposed above the red interference filter 20R, the green interference filter 20G, and the blue interference filter 20B, respectively. A set of the color filters 107R, 107G, and 107B of three colors constitutes one pixel. Here, the color filter 107 simply serves as an auxiliary of the interference filter 20, and is not necessarily required.

Figure 4:
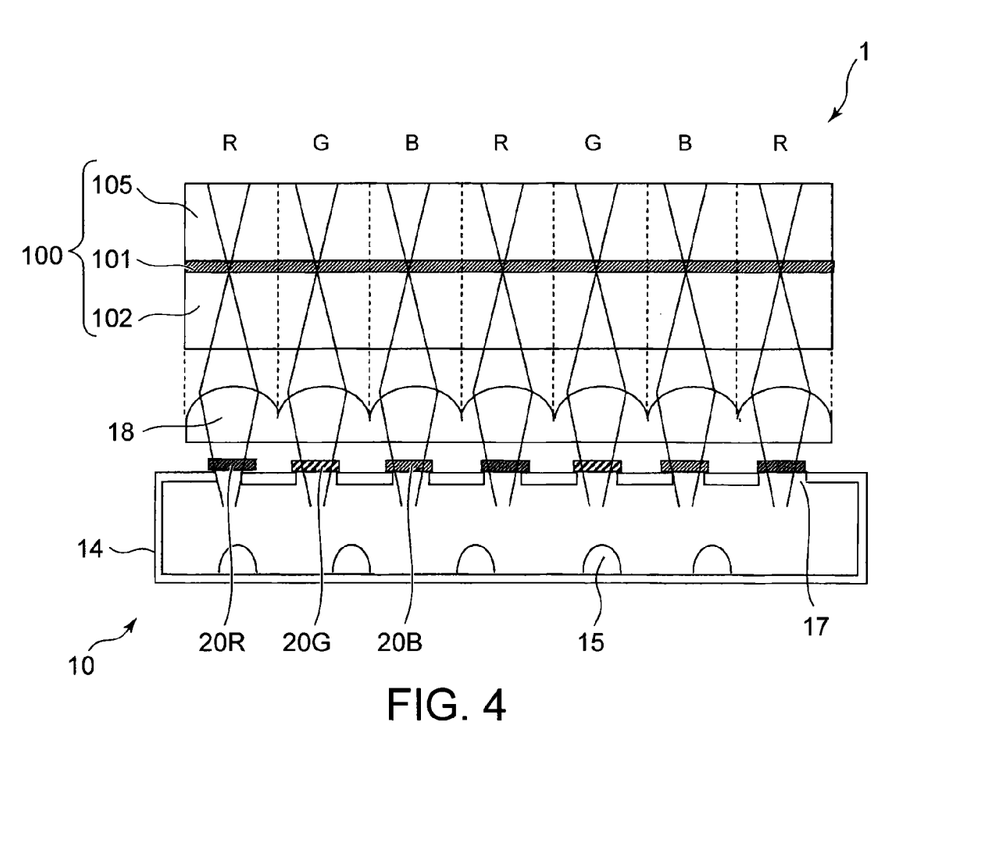
FIG. 4 is a view showing an example of a light path in the liquid crystal display device in the first embodiment.

FIG. 4 is a view showing an example of a path of light extracted from the apertures 17 in a cross-section of the liquid crystal display device.

A portion of light emitted from the light source 15 of the backlight 10 passes through each aperture 17 and the interference filter 20 of each color to come out of the backlight 10 (i.e., direct light). Another portion of light emitted from the light source 15 is repeatedly reflected by the interference filter 20 or the inside wall face of the case 14 to pass through each aperture 17 and the interference filter which allows light of the color to pass therethrough (i.e., multi-reflection light), thereby allowing the multi-reflection light to come out of the backlight 10. The direct light and the multi-reflection light coming out of the backlight 10 pass through the red interference filter 20R, for example, and are focused by the lens located just above the red interference filter 20R. The focused beam of light forms an image in the vicinity of the liquid crystal layer 101. The focal length is restricted so that the image does not exceed the range of the color filter 107R in size. If the image formed by the lens is larger than the red color filter 107R in size, the light spreads out toward the adjacent color filters 107G and 107B to be absorbed by the color filters 107G and 107B, thereby resulting in a loss. Thereafter, the image-forming light passes through the red color filter 107R and the counter substrate 105 to come out of the display panel 100.

Similarly, each light passing through the green interference filter 20G and the blue interference filter 20B is focused by the lens of the lens array 18 located just thereabove and forms an image in the vicinity of the liquid crystal layer 101. The image-forming light passes through the green color filter 107G or the blue color filter 107B and then passes through the counter substrate 105 to come out of the display panel 100.

Figure 5:
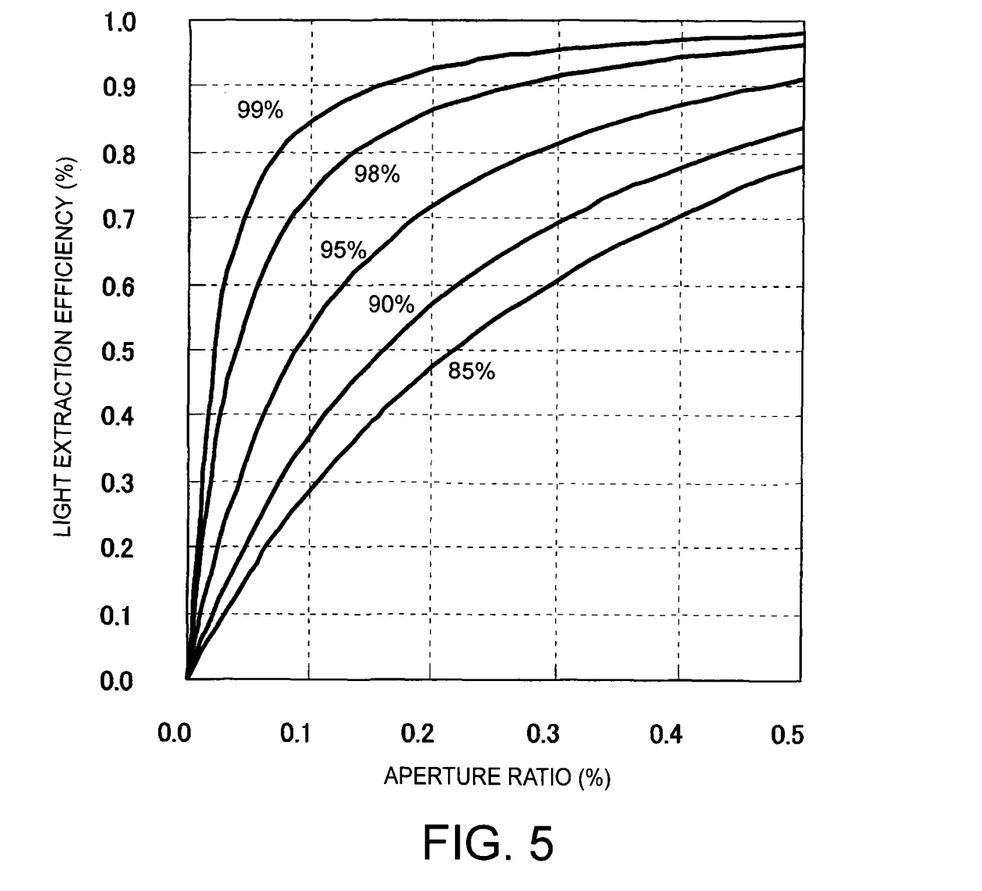
FIG. 5 is a graph showing relations between an aperture ratio and an efficiency of light extraction in the first embodiment.

FIG. 5 is a graph showing relations between an aperture ratio of the inside wall face of the case 14 and the light extraction efficiency $\eta_t$ of the light extracted to the outside of the backlight 10 through the apertures 17. In FIG. 5, the horizontal axis denotes the aperture ratio and the vertical axis denotes the light extraction efficiency $\eta_t$. FIG. 5 shows the relations for reflectances of 85%, 90%, 95%, 98%, and 99% of the inside wall face of the case 14. The aperture ratio denotes a value to be acquired by dividing the total area of the apertures 17 of the backlight 10 by the area of the upper face of the backlight 10. Here, the area of the upper face of the backlight 10 includes the area of the apertures 17. The light extraction efficiency $\eta_t$ denotes a value to be acquired by dividing a total amount of the light extracted through the apertures 17 by a total amount of light passing through the area of the upper face (i.e., the face at which the apertures 17 are formed) of the backlight 10 in a state that the upper face thereof is removed. Here, both the total amount of the light extracted through the apertures 17 and the total amount of the light passing through the area of the upper face of the backlight 10 in the state that the upper face thereof is removed denote values without the interference filter 20.

It is considered that the light extraction efficiency $\eta_t$ increases with an increase in the reflectance of the inside wall of the case 14 and with an increase in the aperture ratio of the apertures 17.

Details of the light extraction efficiency $\eta_t$ have been studied to provide several findings as follows. FIGS. 6A to 6D show relations between the aperture ratio and each of the light extraction efficiency $\eta_t$, a light extraction efficiency $\eta_d$ of the direct light, a light extraction efficiency $\eta_i$ of the multi-reflection light, and a difference $\eta_t - \eta_d$. The difference $\eta_t - \eta_d$ is a difference between the light extraction efficiency of the multi-reflection light and the light extraction efficiency of the direct light.

The light extraction efficiency $\eta_d$ of the direct light denotes a value acquired by dividing a total quantity of the direct light extracted through the apertures 17 by the total quantity of light exiting through the area of the upper face (i.e., the face at which the apertures 17 are formed) of the backlight 10 in the state that the upper face thereof is removed. The light extraction efficiency $\eta_i$ of the multi-reflection light denotes a value acquired by dividing a total amount of the multi-reflection light extracted through the apertures 17 by the total amount of light permeating the area of the upper face of the backlight 10 in the state that the upper face thereof is removed. FIGS. 6A to 6D show reflectances of 99%, 98%, 95% and 90% of the inside wall face of the case 14.

The light extraction efficiency $\eta_d$ of the direct light is dependent on the aperture ratio to linearly increase. Further, the light extraction efficiency $\eta_d$ of the direct light is not affected by the reflectance of the inside wall face of the case 14, and remains approximately at the same value.

The light extraction efficiency $\eta_i$ of the multi-reflection light reaches a maximum value at the aperture ratio of a certain fixed value and decreases when the aperture ratio becomes larger than the fixed value. Further, the light extraction efficiency of the multi-reflection light increases with an increase in the reflectance of the inside wall of the case 14. Accordingly, it is considered that the total light extraction efficiency $\eta_t$ increases as a whole with an increase in the reflectance of the inside wall face of the case 14 as a result of an increase in the light extraction efficiency $\eta_t$ of the multi-reflection light.

Further, the light extraction efficiency $\eta_t$ increases when the aperture ratio is large. This increase in the light extraction efficiency $\eta_t$ includes a high light extraction efficiency $\eta_i$ of the multi-reflection light and a low light extraction efficiency $\eta_d$ of the direct light. When the light sources 15 are sparsely disposed on the inside wall face of the case 14, an amount of the direct light passing through the apertures 17 located close to the light sources 15 is large and an amount of the direct light extracted through the aperture 17 located far from the light sources 15 is small. Meanwhile, the multi-reflection light comes out of every aperture 17 approximately by an equal amount regardless of an arrangement of the light sources 15. Accordingly, when a rate of the direct light is larger than that of the multi-reflection light, brightness irregularity of the backlight 10 caused by the arrangement of the light sources 15 is apt to occur. Hence, when the aperture ratio is set so that the rate of the multi-reflection light in the light extracted through the apertures 17 becomes large, the brightness irregularity can be prevented.

Figure 6A:
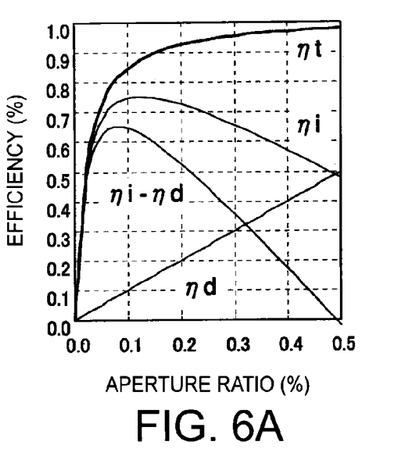
FIGS. 6A to 6D are graphs showing relations between the aperture ratio and the efficiency of light extraction in the first embodiment.
Figure 6B:
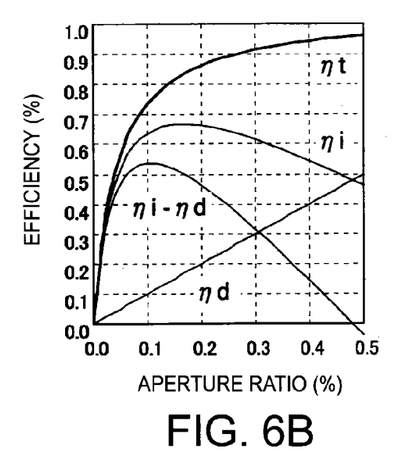
Figure 6C:
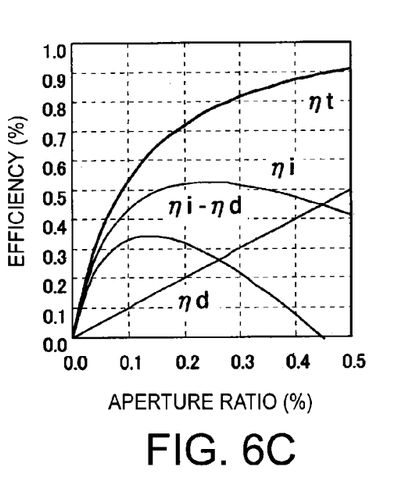
Figure 6D:
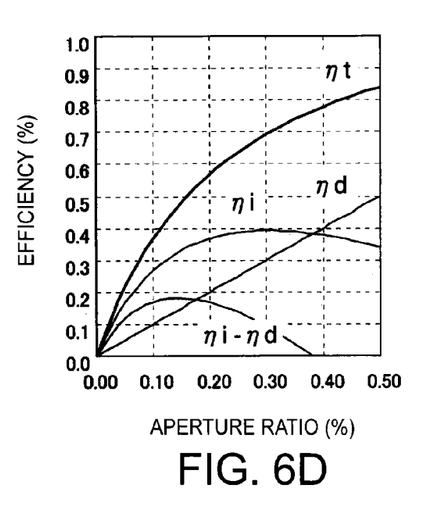

The difference $\eta_i - \eta_d$ between the light extraction efficiencies of the multi-reflection light and the direct light increases with an increase in the aperture ratio in any reflectance of the inside wall face of the case 14, and then decreases in due course after reaching the maximum value. The proportion of the multi-reflection light in the light extracted through the apertures 17 is the largest when the difference $\eta_i - \eta_d$ between the light extraction efficiencies of the multi-reflection light and the direct light reaches the maximum.

Figure 7:
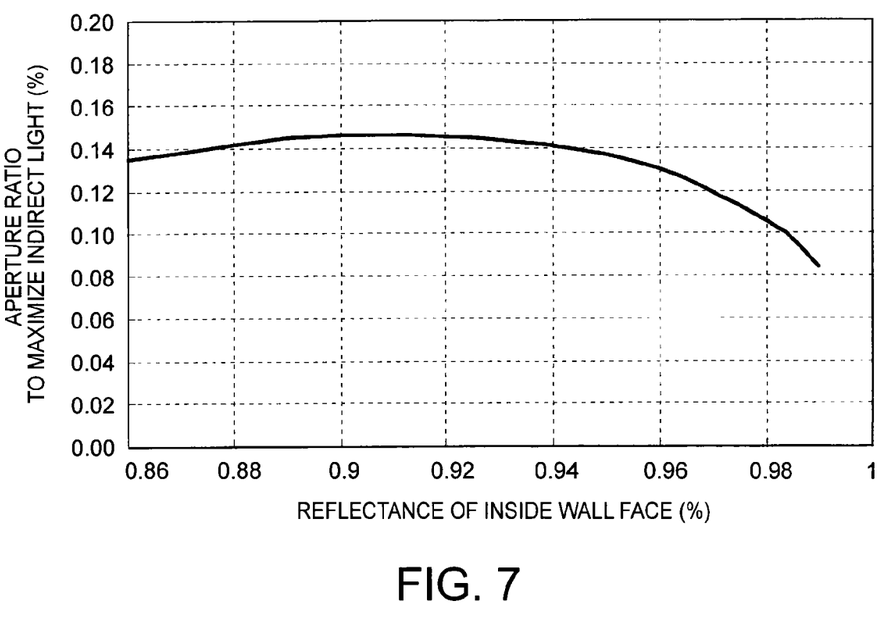
FIG. 7 is a graph showing a relation between a reflectance in an inside wall face of a case and the aperture ratio to maximize a rate of indirect light to the extracted light according to the first embodiment.

The value of the aperture ratio to maximize the difference $\eta_i - \eta_d$ between the light extraction efficiencies of the multi-reflection light and the direct light varies depending on the reflectance value of the inside wall face of the case 14. FIG. 7 shows a relation between the reflectance of the inside wall face of the case 14 (i.e., the horizontal axis) and the value of the aperture ratio to maximize the difference $\eta_i - \eta_d$ between the light extraction efficiencies of the multi-reflection light and the direct light (i.e., the vertical axis).

It is shown that the aperture ratio to maximize the difference $\eta_i - \eta_d$ between the light extraction efficiencies of the multi-reflection light and the direct light stays within a range approximately between 8% and 15% if the reflectance of the inside wall face of the case 14 stays within a range between 86% and 99% inclusive. That is, restricting the aperture ratio of the backlight 10 within the range between 8% and 15% allows it to increase the rate of the multi-reflection light contained in the light from the backlight 10 and to decrease the rate of the direct light. Accordingly, the brightness irregularity can be reduced.

The backlight 10 without the interference filter 20 is used to acquire the appropriate aperture ratio range between 8% and 15%. That is, when nothing or no member having wavelength selectivity is disposed between the apertures and the crystal liquid panel, the aperture ratio is to be designed within the range between 8% and 15%. If the interference filters 20 of three colors are disposed at the apertures, only one third of the light from the light source 15 passes through one interference filter 20, thereby designing the aperture ratio to triple the above appropriate range. That is, the aperture ratio of the backlight is designed to be within a range between 24% and 45%. Alternatively, the aperture ratio is designed to be within a range between 8×N % and 15×N % when interference filters of N colors are disposed. Here, N denotes a positive integer.

The above liquid crystal display device 1 has an effect to suppress brightness irregularity even without the interference filter 20 of the backlight 10. However, as a result of the interference filters 20, only the light of a color passing through the color filters 107R, 107G, and 107B of the liquid crystal panel 100 passes through the interference filter 20, while the light of a color which does not pass through the color filters 107R, 107G, and 107B is returned into the case 14. In this manner, it is possible to reduce a light loss of the light source 15 by the amount to be absorbed in the color filters 107R, 107G, and 107B after coming out of the backlight 10.

The present embodiment just provides an example and the scope of the present invention is not limited to the present embodiment.

Second Embodiment

A color filter of non-absorption type (i.e., an interference filter) reflects light of a color not passing through each color filter to recycle light, thereby enabling it to reduce power consumption of a backlight in comparison with a color filter of absorption type.

In the second embodiment, an interference filter for three colors disposed at the backlight will be explained. A main face having the interference filter of the backlight disposed is provided with an optically-transparent substrate and the interference filter without apertures. The interference filter is constituted with a part which allows light of a fixed wavelength to pass therethrough and a part which reflects light of every wavelength in a visible light range. When the part allowing light to pass therethrough is regarded as an aperture, the aperture ratio is designed to be within a range between 24% and 45%.

The rest other than the main face having the interference filter of the backlight disposed is the same as in the first embodiment. Detailed explanation will not be repeated.

Figure 8:
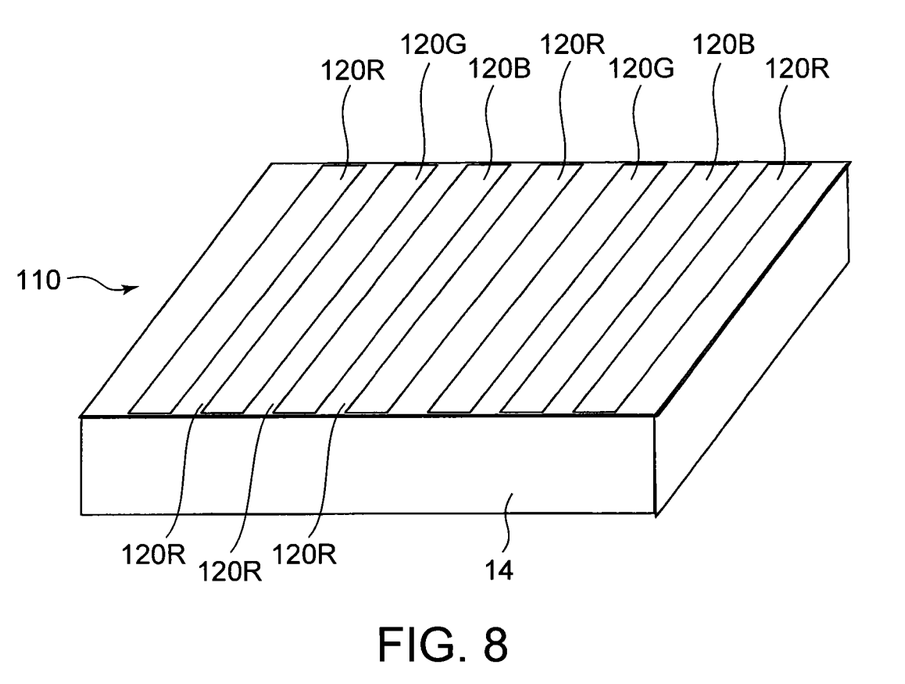
FIG. 8 is a perspective view showing a backlight according to a second embodiment.
Figure 9:
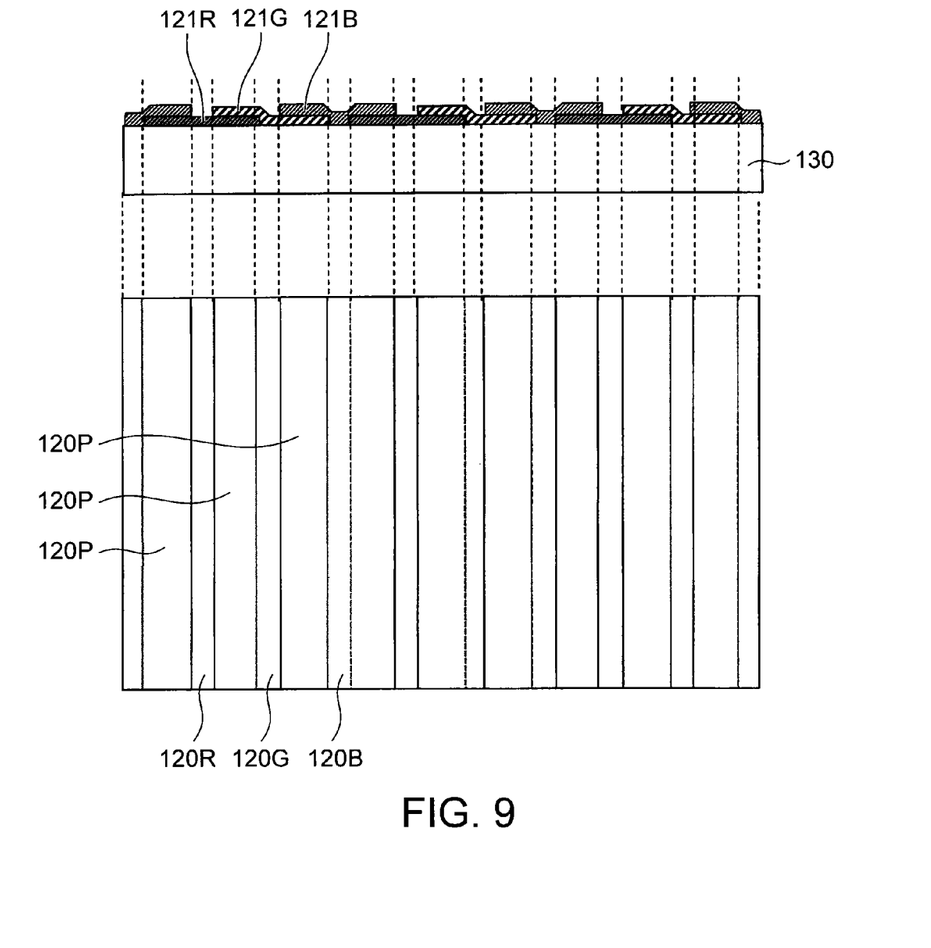
FIG. 9 is an enlarged sectional view showing an upper face of the backlight in the second embodiment.

FIG. 8 is a perspective view of a backlight 110. FIG. 9 is a view showing a cross-section of a main face (i.e. an upper face) on the lens array side of the backlight 110, and a top view of an interference filter 120 disposed on the backlight 110. The upper face 116 includes a transparent glass substrate 130 and the interference filter 120 formed thereon.

The interference filter 120 is constituted with three types of membranes (i.e., a red permeable membrane 121R, a green permeable membrane 121G, and a blue permeable membrane 121B) with dielectric films laminated. Following is an example to prepare an interference filter for respective colors by utilizing $TiO_2$ for a high reflective index layer and $SiO_2$ for a low reflective index layer. When the red permeable membrane 121R having a ¼ wavelength membrane is regarded as a base unit, two or more sets of a ¼ wavelength membrane of a high reflective index layer and a ¼ wavelength membrane of a low reflective index layer which are alternately laminated are disposed on a ⅛ wavelength membrane of a low reflective index layer, and then a ⅛ wavelength membrane of a low reflective index layer is formed as a top layer.

Here, the interference filter having better characteristics, such as higher permeability for red light and higher impermeability for other color light, can be prepared as the number of layers increases. Specifically, the red permeable membrane 121R can be prepared so that the thickness of the ¼ wavelength membrane of a $TiO_2$ layer is 50 nm and the thickness of the ¼ wavelength membrane of a $SiO_2$ layer is 84 nm. For example, two or more sets of a 72 nm-thick $TiO_2$ layer and a 123 nm-thick $SiO_2$ layer which are alternately laminated are disposed on a 61.5 nm-thick $SiO_2$ layer to prepare the green permeable membrane 121G. After the 61.5 nm-thick $SiO_2$ layer is formed, a 21 nm-thick $TiO_2$ layer is formed thereon.

Then, two or more sets of a 72 nm-thick $SiO_2$ layer and a 72 nm-thick $TiO_2$ layer are laminated and a 21 nm-thick $TiO_2$ layer is formed thereon.

For example, two or more sets of a 104 nm-thick $SiO_2$ layer and a 60 nm-thick $TiO_2$ layer are laminated on a 30 nm-thick $TiO_2$ layer and then a 30 nm-thick $TiO_2$ layer is formed thereon in order to prepare the blue permeable membrane 121B.

The red permeable membrane 121R allows red light to pass therethrough and reflects other color light in the visible light range. The green permeable membrane 121G allows green light to pass therethrough and reflects other color light in the visible light range. The blue permeable membrane 121B allows blue light to pass therethrough and reflects other color light in the visible light range.

The red permeable membrane 121R, the green permeable membrane 121G and the blue permeable membrane 121B are periodically aligned and adjacent membranes are partially overlapped. The overlapped part of the two membranes 121R, 121G, and 121B reflects light of every wavelength in the visible light range (i.e., a reflection part 120P).

Red light passes through a part (i.e., a red color part 120R) of the red permeable membrane 121R which is not overlapped with the other membranes 121G and 121B. Similarly, greed light passes through a part (i.e., a green color part 120G) of the green permeable membrane 121G which is not overlapped with the other membranes 121R and 121B. Blue light passes through a part (i.e., a blue color part 120B) of the blue permeable membrane 121B which does not overlap with the other membranes 121R and 121G.

That is, the red color part 120R, the green color part 120G and the blue color part 120B are periodically aligned and the reflection parts 120P are respectively formed therebetween. The red color part 120R, the green color part 120G and the blue color part 120B are regarded as the apertures, because light passes therethrough. In the present embodiment, each area of the red color parts 120R, the green color parts 120G and the blue color parts 120B is designed to be within a range from 8% to 15% of the area of the upper face of the backlight 110. That is, the total area of the red color parts 120R, the green color parts 120G and the blue color parts 120B which are regarded as the apertures is designed to be within a range from 24% to 45% of the area of the upper face of the backlight 110.

Figure 10A:
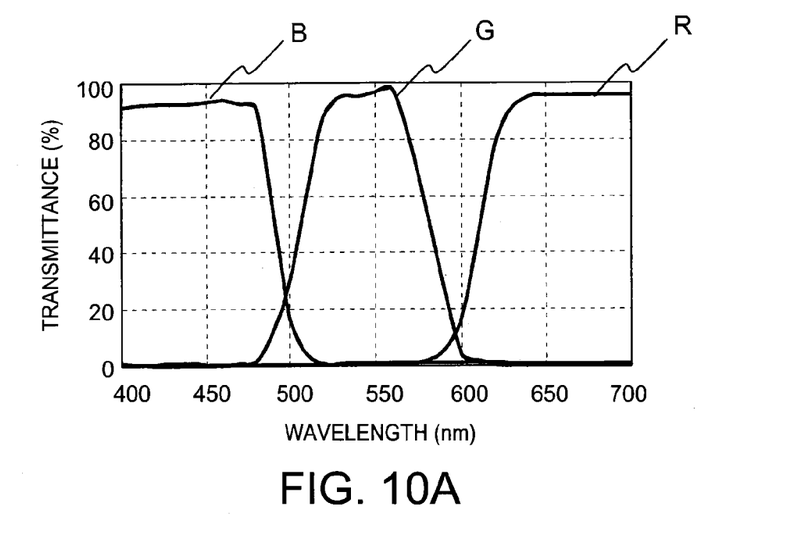
FIGS. 10A and 10B are graphs showing transmittances and reflectances of an interference filter in the second embodiment.
Figure 10B:
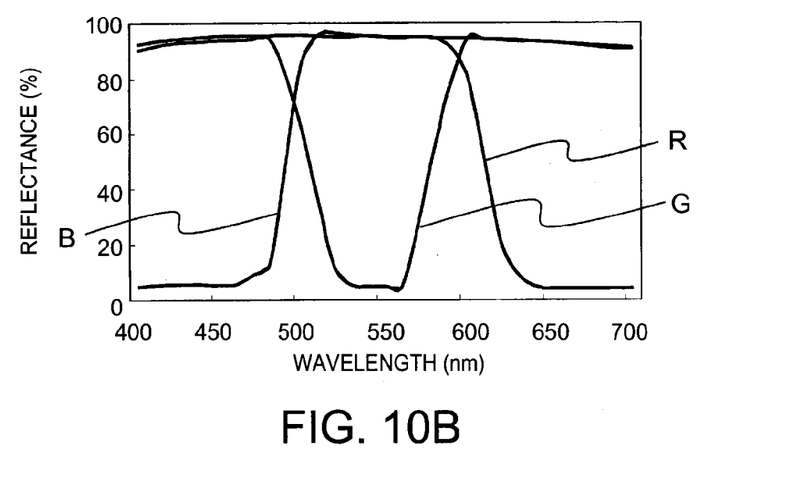

The red permeable membrane 121R and the green permeable membrane 121G overlap with each other to form the reflection part 120P located just between the red color part 120R and the green color part 120G. The reason why the overlapped part of two kinds of membranes reflects light of every color will be explained with reference to FIGS. 10A and 10B. FIG. 10A is a graph showing an example of spectra of light passing through the red permeable membrane 121R, the green permeable membrane 121G and the blue permeable membrane 121B, respectively. FIG. 10B is a graph showing an example of spectra of light reflected by the red permeable membrane 121R, the green permeable membrane 121G and the blue permeable membrane 121B, respectively.

For example, the red permeable membrane 121R allows red light to pass therethrough and reflects light of other wavelength. Similarly, the green permeable membrane 121G allows green light to pass therethrough and reflects light of other wavelength. The blue permeable membrane 121B allows blue light to pass therethrough and reflects light of other wavelength.

Figure 11:
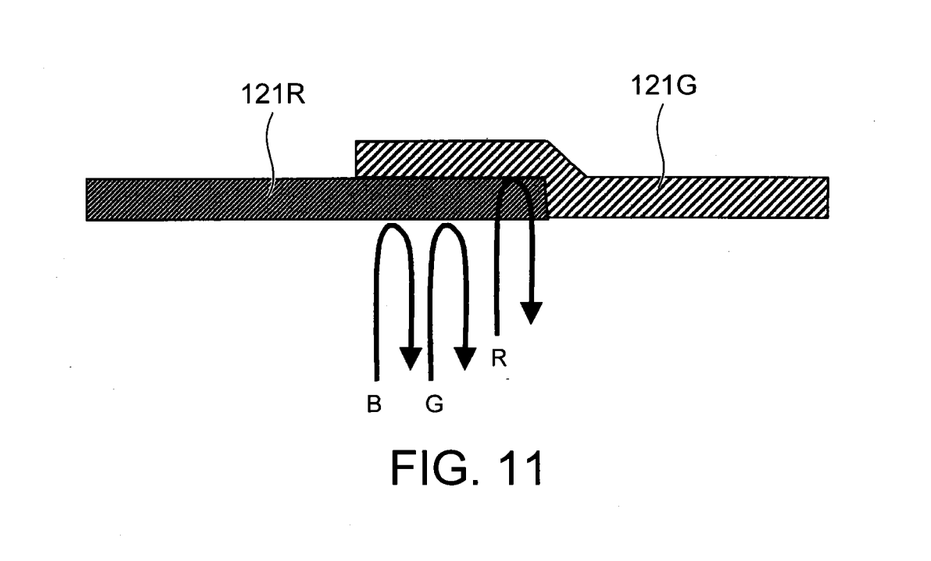
FIG. 11 is an enlarged sectional view showing an overlapped part between a red permeable membrane and a green permeable membrane of the interference filter according to the second embodiment.

FIG. 11 is a view showing a part at which a portion of the green permeable membrane 121G overlaps with the red permeable membrane 121R. When light is emitted from the light source located on the lower side of the red permeable membrane 121R, blue light and green light are reflected by the red permeable membrane 121R and only red light passes therethrough. However, the red light is reflected by the green permeable membrane 121G and permeates through the red permeable membrane 121R once again to return to the light source side. In this manner, light of every color is reflected by the reflection part 120P.

As a method to prepare the interference filter 120 as shown in FIG. 9, there has been a method to utilize a photolithography technology, for example. Specifically, membranes designed to allow permeation of red light and to reflect light of other colors are formed on a transparent glass substrate 130 at a prescribed pitch. Next, membranes designed to allow permeation of green light and to reflect light of other colors are formed at a prescribed pitch so as to partially overlap with the membrane allowing permeation of red light. At that time, there remain portions on the substrate 130, which have neither the membrane allowing permeation of red light nor the membrane allowing permeation of green light formed. Subsequently, a membrane designed to allow permeation of blue light and to reflect light of other colors are formed so that the designed membrane covers portions which have not been covered with any membrane; a part of the designed membrane overlaps with the membrane allowing permeation of red light; and the other part of the designed membrane overlaps with the membrane allowing permeation of green light. In this manner, the interference filter 120 can be obtained.

In the above, the reflection part 120P is exemplified, in which the green permeable membrane 121G is overlapped onto the red permeable membrane 121R. Similarly, every reflection part 120P reflects light of every wavelength within the visible light range.

In the above, two kinds of the multilayer membranes are laminated to form the reflection part 120P. Alternatively, a multilayer membrane to reflect light of every color may be newly formed. Here, laminating two kinds of the multilayer membranes can provide more reduced manufacturing steps than newly forming the membrane for the reflection part 120P.

As described above, the interference filter 120 of the backlight 110 is designed so that parts allowing permeation of light are to be within the range from 24% to 45%. Accordingly, brightness irregularity can be prevented as well as in the first embodiment.

Figure 12A:
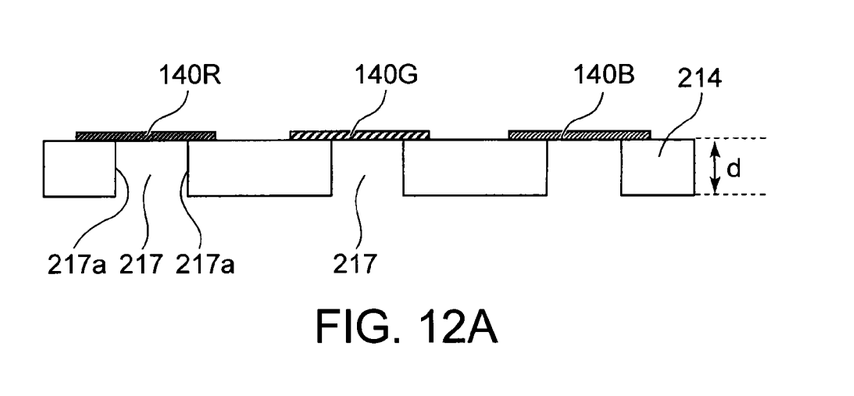
FIGS. 12A and 12B are views showing sectioned upper faces of backlights of comparative examples.
Figure 12B:
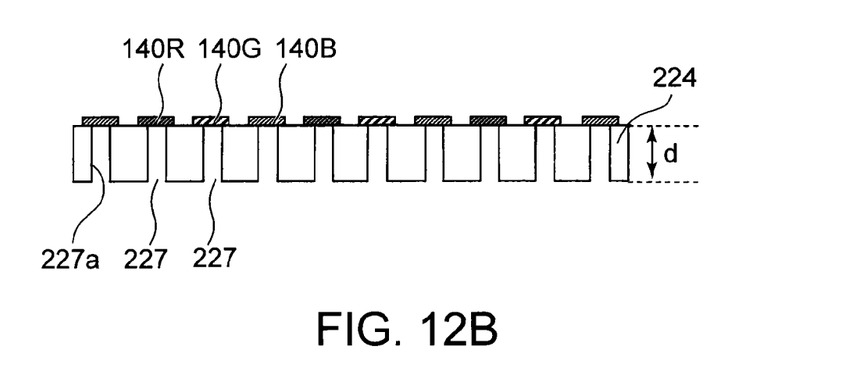

In addition, the light extraction efficiency of the backlight 110 using the interference filter 120 of the present embodiment could be higher than that of the backlight of which apertures are formed by making holes. A backlight having wide apertures will be compared with a backlight having narrow apertures with reference to FIGS. 12A and 12B. FIG. 12A is a view showing a cross-section of the upper face of the backlight having wide apertures 217. FIG. 12B is a view showing a cross-section of the upper face of the backlight having narrow apertures 227. Interference filters 140R, 140G, and 140B for three colors are disposed above the apertures. The width of the apertures of the backlight 200 decreases with an increase in the resolution of a liquid crystal panel.

Light from the light source passes through the apertures 217 and 227 to come out of the backlight. Some light entering the apertures is reflected and diffused at the wall faces 217a, 227a of the apertures to change the direction thereof.

When the apertures is narrower than the thicknesses d of the upper face 214 and 224 of the backlight, a rate of light (i.e., loss) being reflected and diffused at the wall face 227a of the apertures to change the direction thereof becomes high among the light entering the apertures 227. Accordingly, there is a possibility that directionality of light is lost and the light extraction efficiency is decreased.

However, such a loss due to a decreased area of parts through which light passes does not occur in the embodiment employing the interference filter. Accordingly, the interference filter is applied to even a high-definition liquid crystal panel, thereby allowing it to prevent a decrease in the light extraction efficiency.

In the above, the inside wall face of the backlight is formed of aluminum or silver. However, it is also possible to dispose a dielectric multilayer on the inside wall face of the backlight. For example, a high reflective index dielectric material and a low reflective index dielectric material are alternately laminated as well as in the interference filter. Permeation of light is allowed in an infrared range and an ultraviolet range so that only light of wavelength within the visible light range is reflected. For example, when $TiO_2$ is used for the high reflective index layer and $SiO_2$ is used for the low reflective index layer, a 45 nm-thick $SiO_2$ layer is formed on the inside wall face of a case. Two or more sets of a 52.5 nm-thick $TiO_2$ layer and a 90 nm-thick $SiO_2$ layer are alternately laminated to be disposed on the 45 nm-thick $SiO_2$ layer, and are followed by formation of a 45 nm-thick $SiO_2$ layer thereon.

While a certain embodiment of the invention has been described, the embodiment has been presented by way of examples only, and is not intended to limit the scope of the inventions. Indeed, the novel elements and apparatuses described herein may be embodied in a variety of other forms; furthermore, various omissions, substitutions and changes in the form of the methods described herein may be made without departing from the spirit of the invention. The accompanying claims and their equivalents are intended to cover such forms or modifications as would fall within the scope and spirit of the invention.

What is claimed is:

1. A backlight comprising:
a case;
a light source disposed in the case; and
a filter of interference type disposed in a main face of the case,
wherein
the filter includes N kinds of membranes (N is a positive integer) which are periodically aligned;
the membranes are formed so that adjacent membranes are partially overlapped;
the membranes allow permeation of light within a fixed wavelength range and reflect light within a range of other wavelength in accordance with the kinds of the membranes; and
a total area of parts which do not overlap with the adjacent membrane of the membranes is not less than 8×N % and not more than 15×N % of an area of the main face on which the filter is disposed.

2. A liquid crystal display device comprising:
a liquid crystal panel including:
a pair of substrates; and
a liquid crystal layer held between the pair of substrates; and
a backlight including:
a case;
a light source disposed in the case; and
a filter of interference type disposed in a main face of the case facing the liquid crystal panel,
wherein
the filter includes N kinds of membranes which are periodically aligned (N is a positive integer);
the membranes are formed so that adjacent membranes partially overlap with each other;
the membranes allow permeation of light within a fixed wavelength range and reflect light within a range of other wavelength in accordance with the kinds of the membranes; and
a total area of parts which do not overlap with the adjacent membrane of the membranes is not less than 8×N % and not more than 15×N % of an area of the main face on which the filter is disposed.

* * * * *